United States Patent Office 3,225,117
Patented Dec. 21, 1965

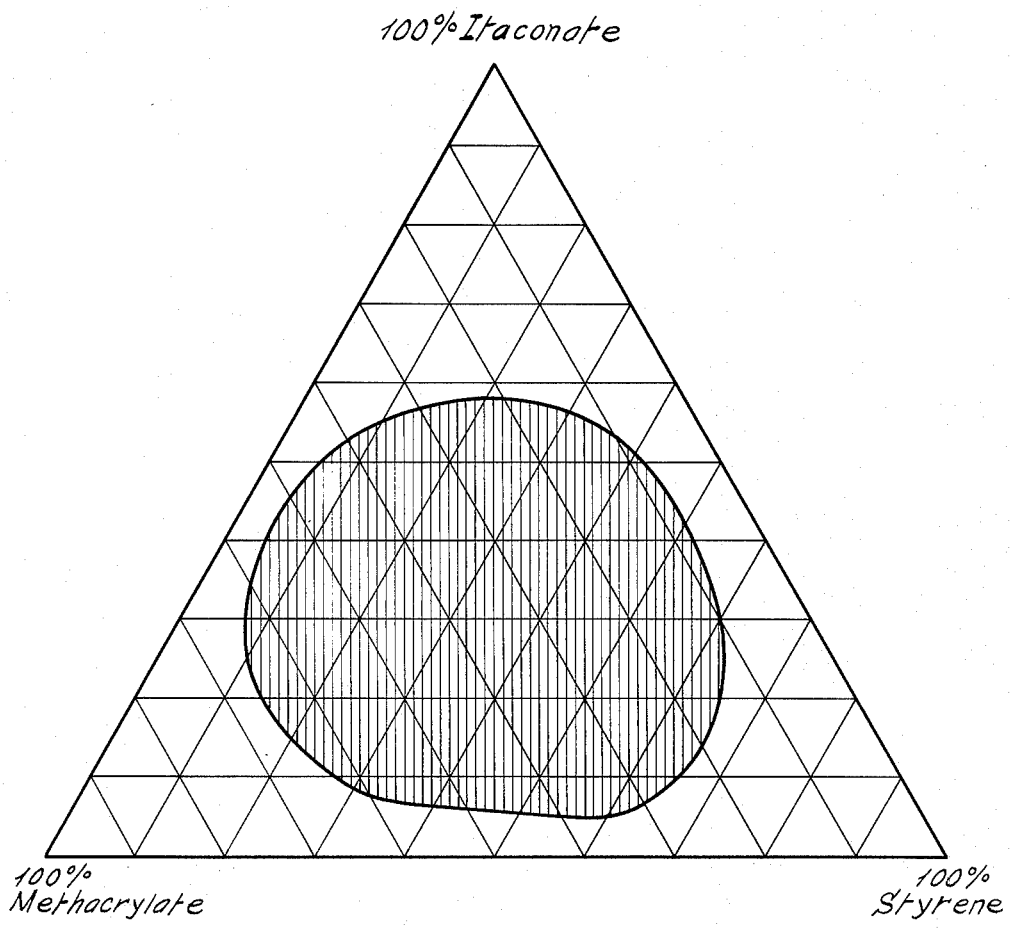

3,225,117
WEATHER-RESISTANT PLASTICS
Robert C. Harper, Loveland, Ohio, assignor to The Cincinnati Milling Machine Company, Cincinnati, Ohio, a corporation of Ohio
Filed June 15, 1962, Ser. No. 202,774
12 Claims. (Cl. 260—872)

This invention relates to polyester resin molding compositions and more particularly to compositions of this type suitable for use in molding reinforced plastic laminates having improved weather resistance.

Polyester resins formed by cross-linking linear polyesters or alkyds with styrene are extensively used in general purpose molding compositions for molding a wide variety of plastic products. One rapidly growing use of such polyester resin compositions is in the manufacture of various articles of furniture. When employed as a resin component of a reinforced plastic laminate, they can be advantageously used in the production of lightweight molded furniture having good physical strength. Such furniture is especially popular because of the variety of bright colors and attractive finishes that can be obtained by suitable pigmentation and processing of the molding compositions.

Because of its light weight, attractive appearance, and imperviousness to moisture, there has been a tendency to use such molded furniture out-of-doors in gardens, patios, open porches and the like where it is more or less continuously exposed to the deteriorative effects of adverse climatic factors such as solar radiation, rain, and dust- and sand-laden wind. In these circumstances it is evident that the weather resistance of the molded material is a matter of considerable importance.

Deterioration caused by weathering shows itself in many ways, some of which are much more serious than others for most uses. Probably the most objectionable effect of outdoor weathering on reinforced plastic laminates is the eruption of the reinforcing fibers through the laminate surface. Even a slight amount of this effect, commonly called fiber blooming, causes a noticeable change in the surface appearance of the laminate and an apparent change in its color, even though the actual resin color is unchanged. Such fiber blooming or surface fiber prominence can proceed to such an extent that the original surface of the laminate is completely hidden by exposed fibers.

Two other serious effects of weathering are loss of resin gloss and color change. The former is normally a result of a chemical or physical breakdown of the resin surface. The latter can be caused by a change in color of any or all of the ingredients or even by changes in the refractive index of certain components or the interfaces between components, such as the fiber blooming mentioned above. Other weathering effects which occur to some extent but are usually less significant include warping or other physical distortion of the molded material, crazing of the surface or subsurface of the resin and resin haze.

Unmodified polyester resins are among the poorest resins in respect to their ability to resist fiber blooming, loss of gloss and color change when used out-of-doors. Even when they are light-stabilized by incorporation of an ultra-violet absorber, they are only slightly better than the unmodified resins. In the absence of surface protection they lose 100% of their original surface through fiber blooming and loss of gloss and change from almost colorless to a deep yellow-brown after 18 months' outdoor exposure. Some color change and blooming is usually quite noticeable after 3 months or less.

It is known that the poor weather resistance of the polyester resins can be improved by incorporating an acrylic resin therein, e.g., by using a certain amount of methylmethacrylate monomer in the molding composition. However, this increase in weather resistance is achieved at the expense of reduced moldability. In the manufacture of furniture, relatively thin curved sections are molded in matched metal molds. If a considerable amount of the acrylic component is added to the polyester resin to improve weather resistance, difficulties are encountered in the molding process.

It is an object of the present invention to provide molded articles for outdoor use having improved weather resistance. It is another object of the invention to provide a novel molding composition having good molding properties and capable of being molded into articles having improved weather resistance. It is still another object of the invention to provide a method of molding weather-resistant articles from the molding composition of the invention. Other objects of the invention will be in part obvious and in part pointed out hereafter.

The present invention is based on the discovery that reinforced plastic laminates having both improved weather resistance and good molding properties can be obtained with acrylic resin-modified polyester resins containing a fourth resin-forming component which is a lower dialkyl itaconate. Thus the present molding compositions comprise four resin-forming constituents, namely, an unsaturated alkyd resin, styrene, a lower alkyl methacrylate and a lower dialkyl itaconate. When these four resin-forming materials are properly blended and molded as described in detail below, molded articles are obtained having a weather resistance significantly greater than that of articles molded from either an unmodified polyester resin or an acrylic-modified polyester resin.

As is well known in the art, the alkyd or polyester component of a polyester resin is made by condensation of a dihydric alcohol with an unsaturated dibasic acid, or more commonly, with a mixture of unsaturated and saturated dibasic acids. In some cases minor proportions of alcohols and acids having a functionality greater than two are used, but essentially the polyesters used in the polyester resins are linear condensation products with styrene being used to effect the desired degree of cross-linking. Typical dihydric alcohols used in preparing such linear polyesters are glycols such as ethylene, diethylene, propylene, dipropylene, 1,2-butylene, 2,3-butylene, trimethylene, tetra-methylene and hexamethylene gycols. Typical unsaturated acids that may be used include maleic, fumaric, mesaconic, citraconic, ethylmaleic, and carbic acids. The unsaturated acids can be blended with saturated acids such as adipic, phthalic and succinic acids. The nature of the polyester is not critical in the present compositions, and in general any of the polyesters previously used in polyester resin compositions may be employed. On the other hand, it is known that the polyesters differ somewhat in their weatherability, and it will be apparent to those skilled in the art that especially good weather resistance can be achieved by employing in the present composition a polyester known to have inherently good weather resistance.

The methacrylates and itaconates used in the present compositions are desirably the lower alkyl esters, i.e., the methyl, ethyl, propyl, and butyl esters. In addition to the four resin-forming constituents, the present compositions may contain minor amounts of various known special purpose ingredients, including a peroxide catalyst, e.g. benzoyl peroxide, and an ultra-violet absorber, e.g. 2-hydroxy-4-methoxy-benzophenone or other substituted benzophenones, salicylates or other compounds used by those skilled in the are to retard damage of polymeric materials by ultra-violet light. The amount of ultra-violet absorber used may vary from 0.05 to 5 parts per 100 parts of resin. Also pigments and other coloring materials may be added as desired.

In accordance with the present method, the monomeric resin-forming constituents, which are liquids at atmospheric temperature or slightly above atmospheric temperature, are mixed to form a ternary mixture. The ternary mixture may contain from 0.25 to 65 parts by weight of styrene, 8 to 98 parts by weight of lower alkyl methacrylate, and 1 to 75 parts by weight of lower alkyl itaconate. The solid alkyd resin may be then dissolved in the ternary monomer mixture in such proportions that it constitutes 45% to 80% by weight of the resulting 4-component composition. Thus the resin-forming components of the 4-component mixture desirably comprises by weight approximately 45% to 80% alkyd, 0.05% to 35% styrene, 1.5% to 50% lower alkyl methacrylate, and 0.2% to 40% lower alkyl itaconate. The special purpose ingredients referred to above may be added either before or after addition of the alkyd.

The resulting composition may be molded as such under the usual molding conditions. However, as indicated above, the composition is especially useful in preparing reinforced laminates, and hence it will ordinarily be incorporated with a fibrous reinforcing material before molding. In general any of the fibrous reinforcing materials previously used in making plastic laminates can be used in the present method. These included loose, matted or woven fibers of glass, cellulose, nylon, asbestos or the like. Blends of more than one type of fiber may be used, and the reinforcement may or may not be surface pretreated with a resinous material. A number of suitable reinforcements are described in the specific examples below.

In preparing the laminates, the molding composition is poured on one or more layers of the fibrous reinforcing material, and distributed uniformly therethrough. The reinforcing mat impregnated with the resin-forming molding composition is then molded under conventional molding conditions to produce a molded laminate.

While the proportions of the four resin-forming ingredients may be varied over a fairly wide range, preferred results are obtained by maintaining the relative proportions within somewhat narrower limits. The preferred proportions for the ternary monomeric mixture are indicated in the accompanying drawing which comprises a triangular graph. The relative amounts of styrene, lower alkyl methacrylate and lower alkyl itaconate are preferably so selected as to come within the shaded area of the drawing. The quantity of alkyd resin dissolved in the ternary mixture is preferably such that the alkyd constitutes from 65% to 75% by weight of the total resin-forming components.

In order to point out more fully the nature of the present invention, a number of specific examples are given below of methods of making the present molding compositions and using them to make reinforced laminates. In the examples the degree of weather resistance of the several products is given in terms of a weathering index which is determined in a manner that will now be described. It has been pointed out above that reinforced plastic moldings exposed to weathering deteriorate in a number of different respects, some of which are more important than others. In determining the weathering index, the materials to be evaluated were exposed to the atmosphere for periods of 8 to 24 months at a site in Miami, Florida, 8 to 10 miles inland. The test panels were positioned to face south at an angle of 45° above the horizon. Nine different weathering effects were separately evaluated by comparison with standard samples. Thus surface fiber prominence was evaluated on a scale of 0 to 30 with zero representing no fiber blooming and 30 an arbitrary maximum amount of surface fiber eruption. Color was evaluated on a scale of 0 to 20 and gloss on a scale of 0 to 15 with zero indicating no change in color and gloss, respectively. Sub-surface fiber prominence was evaluated on a 0 to 10 scale. Five less significant factors, namely, warp, edge effect, surface crazing, sub-surface crazing and resin haze, were evaluated on 0 to 5 scales. The nine values thus obtained were added together to obtain the weathering index. Thus a small index indicates relatively good weathering properties and a large index relatively poor weathering properties.

It is evident that the determination of a weathering index in this way is to some extent subjective. However, extensive experience with this system has shown that experienced observers can verify each other's results within relatively close limits.

EXAMPLE 1

A resin composition suitable for molding in accordance with the present process was prepared by blending an alkyd resin, styrene monomer, methylmethacrylate monomer, and dimethyl itaconate monomer. The alkyd resin used was prepared by condensing a mixture of 45 mol percent maleic acid and 55 mol percent phthalic acid with propylene glycol to obtain a solid product having an acid number of 50–60. The solid alkyd was crushed and screened to a particle size of ¼" or less.

The monomers were mixed in the proportions of 217 grams of styrene, 115 grams of methylmethacrylate and 103 grams of dimethyl itaconate, and 7.2 grams of 2-hydroxy-4-methoxy-benzophenone added as an ultra-violet absorber. Thereafter, 1009 grams of the crushed alkyd resin was added slowly to the monomer mixture with vigorous agitation until the alkyd had completely dissolved. 1.5 grams of pigment paste and 1.8 grams of benzoyl peroxide were added to 181 grams of the above resin mixture.

A 13-inch square piece of 2 oz./sq. ft. felted glass fiber mat (Marmyte h.s. chrome mat) was covered on both surfaces with an overlay which was a ⅛ oz./sq. ft. glass veil and placed on a 12" square matched metal flat sheet die with shear edges. The above catalyzed and pigmented molding composition was poured on the mat in such a manner as to allow uniform dispersion through the mat. This "lay-up" was then molded for 2 minutes at 230° F. and a pressure of 30 tons per square foot.

The molded panel was postcured for 75 minutes at a temperature of 200° F. Thereafter it was subjected to an outdoor weathering test in Florida of the type described above for a period of 22.9 months. At the end of this period it showed a weathering index of 5.5

For purposes of comparison, two similarly pigmented moldings with similar reinforcement and overlay were prepared. One of these was with a commercial styrene-based light-stabilized polyester resin. The other was prepared with the same commercial resin but with methylmethacrylate monomer added to give the same percentage (8%) of methacrylate as that contained in the resin of this example. The 24-month Florida weathering changes for these panels are listed below.

| Resin: | Weathering index |
|---|---|
| Alkyd-styrene (2 component) | 39 |
| Alkyd-styrene-methylmethacrylate (3 component) | 18.5 |
| Example resin (4 component) | 5.5 |

EXAMPLE 2

In this example the alkyd resin used was prepared by condensing propylene glycol and a mixture of 70 mol percent maleic acid and 30 mol percent phthalic acid to obtain a solid product having an acid number of 50–60. The solid alkyd was crushed and screened to a particle size of ¼" or less.

Styrene, methylmethacrylate, and dimethyl itaconate monomers were mixed in the proportions of 217 grams of styrene, 115 grams of methylmethacrylate and 103 grams of dimethyl itaconate, and 7.2 grams of 2-hydroxy-4-methoxy-benzophenone added as an ultra-violet absorber. Thereafter, 1009 grams of the crushed alkyd resin was added slowly to the monomer mixture with vigorous agitation until the alkyd had completely dissolved. 2.1 grams of benzoyl peroxide was added as a catalyst to 210 grams of this resin.

A reinforcing mat was prepared from 92.3 parts by weight of ½" resin-treated glass fibers of the type commonly used in reinforced plastics and 7.7 parts of white, resin-treated kraft fibers. The procedure used in preparing the mat was similar to that disclosed in U.S. Patent 2,932,601. A 13" square of this mat weighing 100 grams was placed on a 12" square matched metal flat sheet die with shear edges. The above catalyzed molding composition was poured on the mat in such a manner as to allow uniform dispersion through the mat. This "lay-up" was then molded for 2 minutes at 235° F. and a pressure of 48 tons per square foot.

The molded panel was postcured for 75 minutes at a temperature of 200° F. Thereafter it was subjected to an outdoor weathering test in Florida of the type described above for a period of 24 months. At the end of this period, it had a weathering index of 9.5. This value may be compared with a weathering index of 27.5 for similar panels prepared from a commercial light-stabilized general purpose polyester resin.

EXAMPLE 3

Resin compositions suitable for molding in accordance with the present process were prepared by formulating the mixtures indicated in Table I below using the alkyd resin of Example 2 and 2-hydroxy-4-methoxy-benzophenone as an ultra-violet absorber. The quantities given in Table I are in grams.

condensed with propylene glycol to yield a high melting polyester. Styrene, methylmethacrylate and dimethyl itaconate monomers were mixed in proportions of 50 grams of styrene, 26.7 grams of methylmethacrylate and 23.3 grams of dimethyl itaconate, and 1.67 grams of 2-hydroxy-4-methoxy-benzophenone added as an ultra-violet absorber. 233 grams of the crushed alkyd was sealed in a jar with the monomer mixture and rotated on a ball mill drive until the alkyd was completely dissolved. The resulting mixture was catalyzed with 0.25% of its weight of benzoyl peroxide.

A reinforcing mat 13" square composed of resin-treated fibers and comprising 85 parts by weight of glass fibers and 45 parts by weight of white kraft fibers was used in this example. One of these reinforcing mats, weighing 104 grams, was placed on a 12" square matched metal flat sheet die with shear edges. 180 grams of the catalyzed molding composition was poured on the mat in such a manner as to cause it to become uniformly distributed through the mat. This "lay-up" was then molded at 235° F. and 20 tons per square foot pressure for 10 minutes.

Thereafter, the molded panel was subjected to an accelerated weathering test in an Atlas XW Weather-O-Meter for a period of about 500 hours. At the end of this period, the sample showed a weathering index of 12. This value may be compared with a weathering index of 15.5 for a similar molding in which the methylmethacrylate and dimethyl itaconate monomers were replaced with styrene monomer.

EXAMPLE 5

The alkyd resin used in this example was prepared by condensing a mixture of 50 mol percent fumaric acid and 50 mol percent "Het acid" (1,4,5,6,7,7-hexa-chlorobicyclo [2,2,1]-5-heptene-2, 3-dicarboxylic acid) with a mixture

*Table I*

| Component | A | B | C | D | E | F | Control |
|---|---|---|---|---|---|---|---|
| Alkyd resin | 1,398 | 1,398 | 233 | 233 | 233 | 1,398 | 1,398 |
| Styrene | 123 | 79.2 | 25 | 32.6 | 50 | 350 | 600 |
| Methylmethacrylate | 65.5 | 348.6 | 40 | 17.4 | 26.7 | 187 | 0 |
| Dimethyl itaconate | 564 | 37.2 | 35 | 50 | 23.3 | 59.7 | 0 |
| Ultra-violet absorber | 10.8 | 9.31 | 1.67 | 1.67 | 1.67 | 9.97 | 10.02 |
| Total weight | 2,162 | 1,872 | 334.7 | 334.7 | 334.7 | 2,005 | 2,008 |

Reinforcing mats 13" square composed of resin treated fibers and comprising 85 parts by weight of glass fibers and 37 parts by weight of white kraft fibers were used in this example. Each of the resin compositions of Table I, after having 1% by weight of benzoyl peroxide catalyst added thereto, was used to impregnate one of these mats, and the resulting "lay-ups" were molded at 235° F. and 20 tons/sq. ft. The mat weight and resin weight in grams, the molding time in minutes, and the weathering index of the molded panels after 8 months outdoor weathering in Florida are given in Table II.

*Table II*

| Resin | Mat Wt. | Resin Wt. | Molding Time | Weathering Index |
|---|---|---|---|---|
| A | 117 | 200 | 10.00 | 16 |
| B | 107 | 184 | 10.00 | 10 |
| C | 100 | 184 | 4.25 | 10.75 |
| D | 116 | 198 | 4.25 | 16 |
| E | 112 | 192 | 3.17 | 15.5 |
| F | 112 | 192 | 10.00 | 18 |
| Control | 107 | 184 | 10.00 | 21.75 |

EXAMPLE 4

The alkyd resin used in this example was a commercially available polyester prepared from an approximately 70/30 mol ratio of maleic acid and isophthalic acid, of 50 mol percent propylene glycol and 50 mol percent dipropylene glycol to an acid number of 39. The solid alkyd resin was crushed and screened to a particle size of ¼" or less.

Styrene, methylmethacrylate and dimethyl itaconate monomers were mixed in the proportions of 50 grams of styrene, 26.7 grams of methylmethacrylate, and 23.3 grams of dimethyl itaconate, and 1.67 grams of 2-hydroxy-4-methoxy-benzophenone added as an ultra-violet absorber. 233 grams of the crushed alkyd was blended with the monomers in the manner described in Example 4. The mixture was catalyzed with 1% of its weight of benzoyl peroxide.

A reinforcing mat of the type used in Example 4 and weighing 100 grams was impregnated with 174 grams of the catalyzed molding composition and molded for three minutes at 235° F. and a pressure of 20 tons per square foot in the manner described in Example 4. Thereafter, the molded panel was subjected to an outdoor weathering test in Florida of the type described above for a period of 8 months. At the end of this period, it had a weathering index of 24.25. This value may be compared to a weathering effect of 41.5 for a similar molding in which the methylmethacrylate and dimethyl itaconate monomers were replaced with styrene monomer.

EXAMPLE 6

A resin composition was prepared by blending an alkyd resin, styrene monomer, methylmethacrylate monomer, and diethyl itaconate monomer. The monomers were mixed in the proportions of 50 grams of styrene, 26.7 grams of methylmethacrylate, and 23.3 grams of diethyl itaconate, and 1.67 grams of 2-hydroxy-4-methoxy-benzophenone added as an ultra-violet absorber. 233 grams of the crushed alkyd resin described in Example 2 was dissolved in the monomer mixture by the procedure described in Example 4. This mixture was catalyzed with 1% of its weight of benzoyl peroxide.

A reinforcing mat of the type used in Example 4 and weighing 103 grams was impregnated with 175 grams of the catalyzed molding composition and molded for three minutes at 235° F. and a pressure of 20 tons per square foot in the manner described in Example 4. Thereafter, the molded panel was subjected to an outdoor weathering test in Florida for a period of 8 months. At the end of this period, the sample had a weathering index of 6.75. This value may be compared to a weathering index of 17.75 for a similar molding in which the methylmethacrylate and diethyl itaconate monomers were replaced with styrene monomer.

EXAMPLE 7

A resin composition was made by blending an alkyd resin, styrene monomer, methylmethacrylate monomer, and dibutyl itaconate monomer. The monomers were mixed in the proportions of 50 grams of styrene, 26.7 grams of methylmethacrylate, and 23.3 grams of dibutyl itaconate, and 1.67 grams of 2-hydroxy-4-methoxy-benzophenone added as an ultra-violet absorber. 233 grams of the crushed alkyd resin described in Example 2 was dissolved in the monomer mixture by the procedure described in Example 4. This mixture was catalyzed with 1% of its weight of benzoyl peroxide.

A reinforcing mat of the type used in Example 4 and weighing 91 grams was impregnated with 157 grams of the catalyzed molding composition and molded for three minutes at 235° F. and a pressure of 20 tons per square foot in the manner described in Example 4. Thereafter, the molded panel was subjected to an outdoor weathering test in Florida for a period of 8 months. At the end of this period, the sample had a weathering index of 5.25. This value may be compared with a weathering index of 17.75 for a similar molding in which the methylmethacrylate and dibutyl itaconate monomers were replaced with styrene monomer.

EXAMPLE 8

280 pounds of solid alkyd resin of the type described in Example 2 was melted at 180° F. in a jacketed sigma-blade blender. 32 pounds of methylmethacrylate monomer and 28 pounds of dimethyl itaconate monomer were added and blended with the alkyd resin for 30 minutes at 180° F. The mixture was cooled rapidly to 80° F. 60 pounds of styrene monomer and 2 pounds of 2-hydroxy-4-methoxybenzophenone were added and the mix blended for 30 minutes. A portion of this mixture was catalyzed with 1% of its weight of benzoyl peroxide.

A reinforcing mat of the type used in Example 4 and weighing 94 grams was impregnated with 164 grams of the catalyzed molding composition and molded for three minutes at 235° F. and a pressure of 20 tons per square foot in the manner described in Example 4. Thereafter, the molded panel was subjected to an outdoor weathering test in Florida for a period of 8 months. At the end of this period, the sample had a weathering index of 7.25. This value may be compared with a weathering index of 17.75 for a similar molding in which the methylmethacrylate and dimethyl itaconate were replaced by styrene.

EXAMPLE 9

A resin composition was prepared by blending an alkyd resin, styrene monomer, t-butyl methacrylate monomer, and dimethyl itaconate monomer. The monomers were mixed in the proportions of 50 grams of styrene, 26.7 grams of t-butyl methacrylate, and 23.3 grams of dimethyl itaconate, and 1.67 grams of 2-hydroxy-4-methoxy-benzophenone added as an ultra-violet absorber. 233 grams of the crushed alkyd used in Example 2 was dissolved in the monomer mixture by the procedure described in Example 4. This mixture was catalyzed with 1% of its weight of benzoyl peroxide.

A reinforcing mat of the type used in Example 4 and weighing 105 grams was molded with 182 grams of the above catalyzed resin for 4 minutes at 235° F. and a pressure of 20 tons per square foot in the manner described in Example 4. Thereafter, the molded panel was subjected to an outdoor weathering test in Florida for a period of 8 months. At the end of this period, the sample had a weathering index of 14. This value may be compared to a weathering index of 17.75 for a similar molding in which the t-butyl methacrylate and dimethyl itaconate monomers were replaced by styrene monomer.

EXAMPLE 10

A resin composition was prepared by blending an alkyd resin, styrene monomer, methylmethacrylate monomer and dimethyl itaconate monomer. The alkyd resin used was prepared by condensing a mixture of 70 mol percent maleic acid and 30 mol percent phthalic acid with propylene glycol to obtain a solid product having an acid number of 50–60.

The monomers were mixed in the proportions of 165 grams of styrene, 88 grams of methylmethacrylate and 77 grams of dimethyl itaconate, and 5.5 grams of 2-hydroxy-4-methoxy-benzophenone added as an ultra-violet absorber. 770 grams of the solid alkyd, crushed and screened to a particle size of ¼" or less, was added slowly to the monomer mixture with vigorous agitation until the alkyd had dissolved completely. A portion of this resin was catalyzed with 1% of its weight of benzoyl peroxide.

Four layers of 1 oz./sq. ft. felted glass mat (Ferro PEG–1 Silane mat) cut to 13" x 13" and weighing 137 grams, were placed on a 12" square matched metal flat sheet die with shear edges. 192 grams of the above catalyzed molding composition was poured on the mat in such a manner as to cause it to become uniformly distributed through the mat. This "lay-up" was then molded at 235° F. and a pressure of 20 tons per square foot for 3 minutes.

Thereafter, the molded panel was subjected to a weathering test in Florida for a period of 12 months. At the end of this period it had a weathering index of 17.5. This value may be compared with a weathering index of 26 for a similar molding prepared from a commercial styrene-based light-stabilized polyester resin. A similar molding prepared from a commercial alkyd-styrene monomer-methylmethacrylate monomer weather - resistant polyester molding composition under these same conditions had a weathering index of 22.75.

EXAMPLE 11

A resin composition was prepared by blending an alkyd resin, styrene monomer, methylmethacrylate monomer and dimethyl itaconate monomer. The alkyd resin used was prepared by condensing a mixture of 45 mol percent maleic acid and 55 mol percent phthalic acid with propylene glycol to obtain a solid product having an acid number of 50–60.

The monomers were mixed in the proportions of 75 grams of styrene, 40 grams of methylmethacrylate and 35 grams of dimethyl itaconate, and 2.5 grams of 2-hydroxy-4-methoxy-benzophenone added as an ultra-violet absorber. 350 grams of the solid alkyd, crushed and screened to a particle size of ¼" or less, was added slowly to the monomer mixture with vigorous agitation until the alkyd had dissolved completely. 320 grams of this resin was catalyzed by the addition of 3.2 grams of benzoyl peroxide.

Two layers of 2 oz./sq. ft. felted glass fiber mat (Marmyte h.s. chrome mat), cut to 13" x 13" and weighing 132 grams, were placed on a 12" square matched metal flat sheet die with shear edges. The above catalyzed molding composition was poured on the mat in such a manner as to allow uniform dispersion through the mat. This "lay-up" was then molded at 180° F. for ten minutes at a pressure of 30 tons per square foot.

The molded panel was post-cured for 60 minutes at a temperature of 200° F. Thereafter, it was subjected to a weathering test in Florida for a period of 22.9 months. At the end of this period it had a weathering index of 13.

From the foregoing description and examples, it should be apparent that reinforced plastic articles made from the 4-component molding compositions of the present invention incorporating a lower dialkyl itaconate are substantially superior in weather resistance to articles molded from either the unmodified polyester-styrene system (2 components) or the methacrylate-modified polyester resin system (3 components) previously suggested for this application. It is of course to be understood that the foregoing examples are intended to be illustrative only and that numerous changes can be made in the ingredients, proportions and conditions set forth therein without departing from the spirit of the invention as set forth in the appended claims.

I claim:

1. In a plastic molding composition for molding plastic articles under conventional polyester resin molding conditions, said composition being of the type which comprises a mixture of an unsaturated alkyd resin, a lower alkyl methacrylate and styrene, the improvement which comprises from 0.2% to 40% by weight of a lower dialkyl itaconate incorporated in said mixture to improve the weather resistance of articles molded therefrom.

2. In a plastic molding composition for molding plastic articles under conventional polyester resin molding conditions, said composition being of the type which comprises a mixture of an unsaturated alkyd resin, a lower alkyl methacrylate and styrene, the improvement which comprises a lower dialkyl itaconate incorporated in said mixture to improve the weather resistance of articles molded therefrom, the proportions of said mixture being such that the resin and resin-forming constituents thereof are essentially composed of 45% to 80% of said alkyd resin and 55% to 20% by weight of a ternary mixture of styrene, lower alkyl methacrylate and lower dialkyl itaconate containing from 0.25 to 66 parts of styrene, 8 to 98 parts of said methacrylate, and 1 to 75 parts of said itaconate.

3. A composition according to claim 2 and wherein said itaconate is dimethyl itaconate.

4. A composition according to claim 2 and wherein said itaconate is diethyl itaconate.

5. A composition according to claim 2 and wherein said itaconate is dibutyl itaconate.

6. A composition according to claim 2 and wherein said methacrylate is methylmethacrylate.

7. In a plastic molding composition for molding plastic articles under conventional polyester resin molding conditions, said composition being of the type which comprises a mixture of an alkyd resin, methylmethacrylate and styrene, the improvement which comprises a lower dialkyl itaconate incorporated in said mixture to improve the weather resistance of articles molded therefrom, the resin and resin-forming constituents of said composition being essentially composed of from 65% to 75% of said alkyd resin and from 35% to 25% by weight of a ternary mixture of styrene, methylmethacrylate and lower dialkyl itaconate, the relative amounts of the constituents of said ternary mixture being such that its composition falls within the shaded area of the accompanying drawing.

8. A composition according to claim 7 and wherein said itaconate is dimethyl itaconate.

9. A molded plastic article molded under conventional polyester resin molding conditions from a composition that is essentially composed of from 45% to 80% by weight of unsaturated alkyd resin, from 0.05 to 35% by weight of styrene, 1.5% to 50% by weight of methylmethacrylate, and 0.2% to 40% by weight of dimethyl itaconate.

10. The method of making a molded plastic article having improved weather-resistant properties, which comprises impregnating a fibrous reinforcing material with a mixture of from 45% to 80% by weight of an alkyd resin with a ternary mixture of monomers essentially composed of 0.25 to 66 parts of styrene, 8 to 98 parts of lower alkyl methacrylate and 1 to 75 parts of lower dialkyl itaconate, and molding the impregnated reinforcing material under heat and pressure to form said weather-resistant article.

11. A method according to claim 10 and wherein said lower alkyl itaconate is dimethyl itaconate.

12. A molded plastic article molded from a fibrous reinforcing mat impregnated with the composition of claim 2.

References Cited by the Examiner

UNITED STATES PATENTS 3,088,926   5/1963   Morris _____ 260—45.4

FOREIGN PATENTS 710,513   6/1954   Great Britain.

JOSEPH L. SCHOFER, Primary Examiner.

DONALD E. CZAJA, Examiner.